Nov. 16, 1971   R. W. BATTEN   3,620,105
OFFSET DRIVER FOR THREADED FASTENERS
Filed Nov. 7, 1969   2 Sheets-Sheet 1
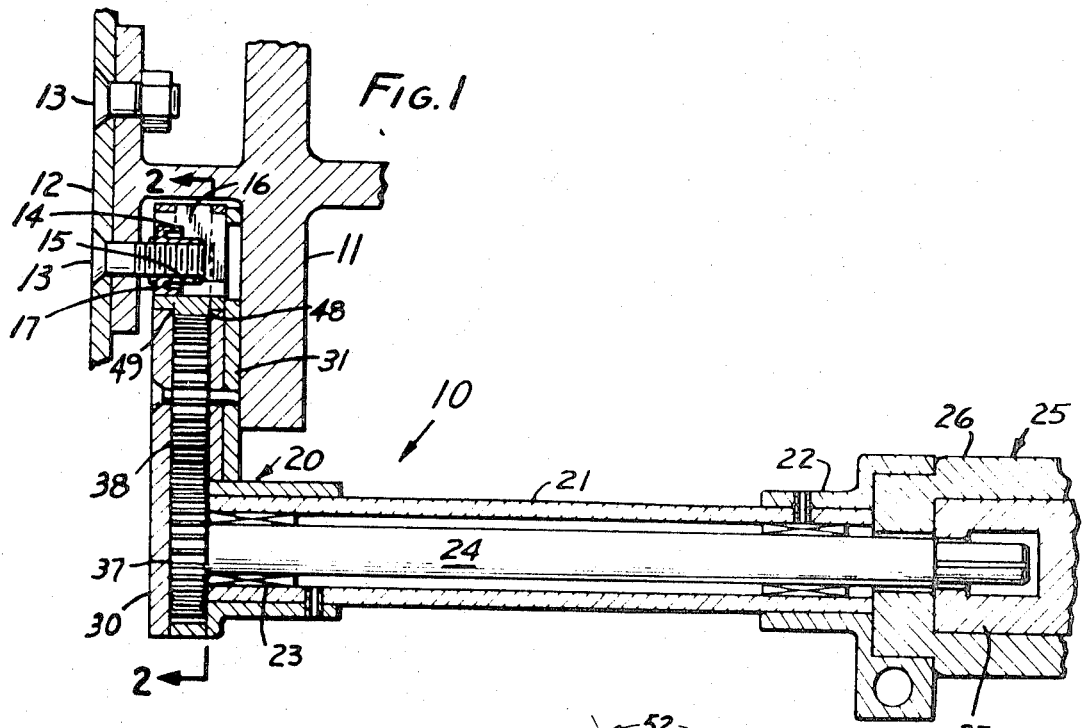
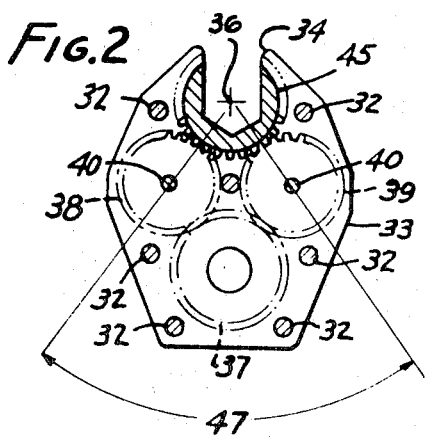
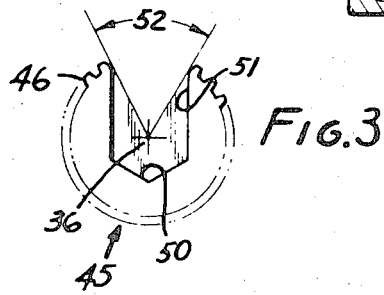
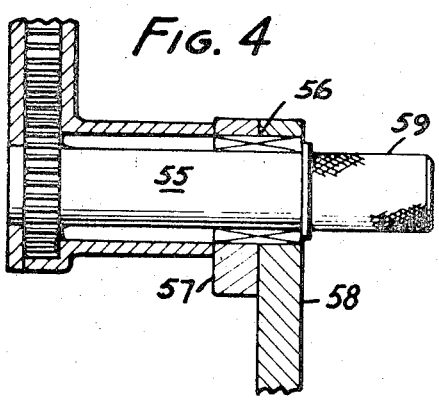
INVENTOR.
RONALD W. BATTEN
BY
ATTORNEYS.

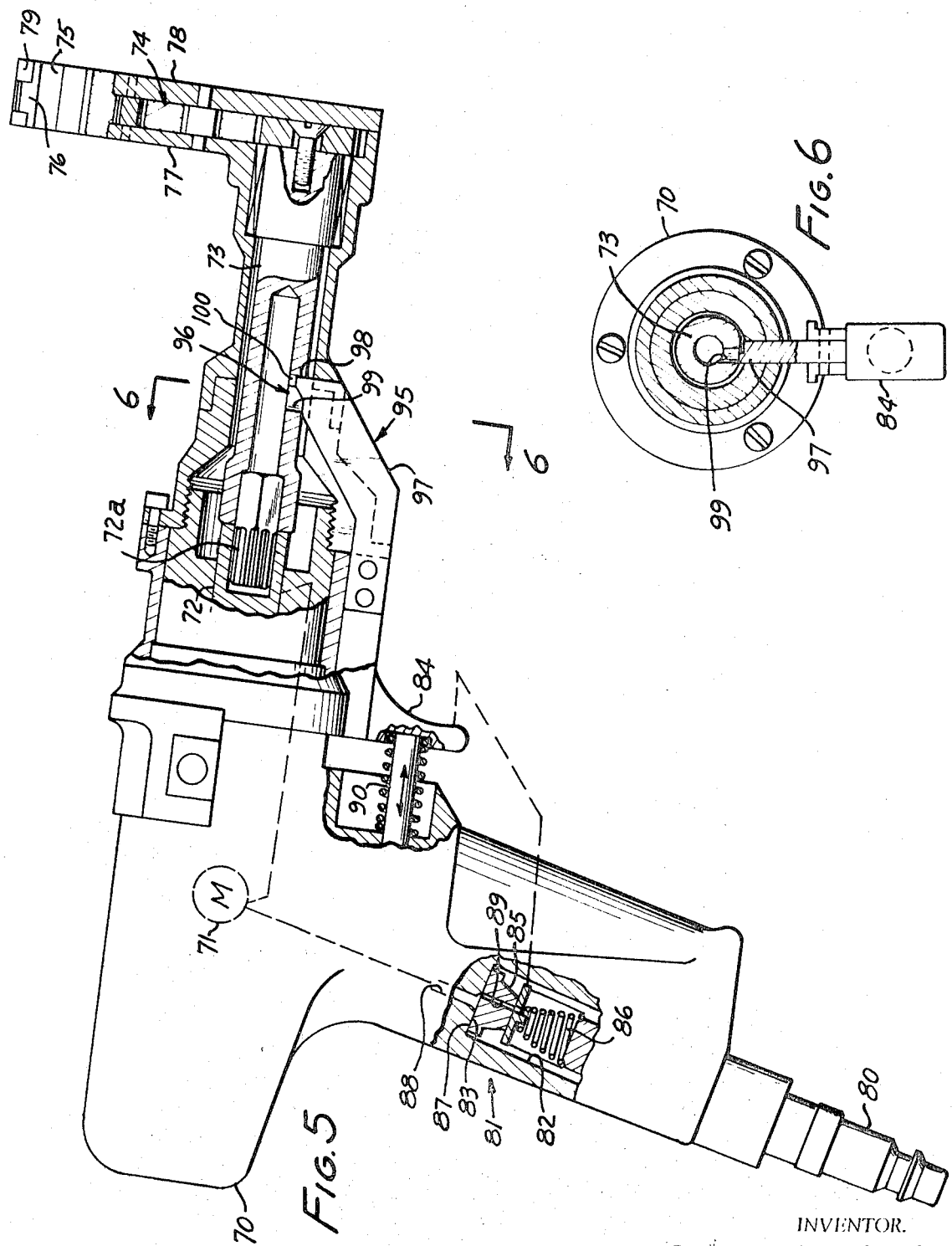

3,620,105
OFFSET DRIVER FOR THREADED FASTENERS
Ronald W. Batten, Torrance, Calif., assignor to Hi-Shear
   Corporation, Torrance, Calif.
Continuation-in-part of application Ser. No. 666,435, Sept.
   8, 1967, now Patent No. 3,477,318. This application
   Nov. 7, 1969, Ser. No. 874,868
         Int. Cl. B25b 13/00, 17/00, 21/00
U.S. Cl. 81—57.14                                   3 Claims

ABSTRACT OF THE DISCLOSURE

This invention relates to a driver for setting threaded fasteners in height-limited environments. The driving portion of the device need not be moved axially, but may be applied to the fastener it is to set by lateral movements, thereby significantly reducing height and manipulations. It includes a body to which are mounted a power shaft and a laterally extending gear train driven by the power shaft which gear train terminates in a pair of branches. Each branch includes a driven gear that is engaged to a driving socket. The socket and the body have alignable slots and the angular extent of the slot at the periphery is less than the angular spacing of the driving gears around the center of rotation of the socket whereby the socket is always driven by at least one of the branches. Means is provided for turning the socket independently of finger actuation so that the socket and body slots can be aligned, and detent means is provided to hold them aligned.

CROSS REFERENCE TO OTHER APPLICATIONS

This patent application is a continuation-in-part of applicant's co-pending U.S. patent application Ser. No. 666,435 filed Sept. 8, 1967; now Pat. No. 3,447,318 entitled "Offset Driver for Threaded Fasteners."

This invention relates to a driver for setting threaded fasteners in height-limited environments, for example where a stud is overhung by a low flange and a nut is to be applied to the stud.

Every installation of a threaded fastener in close quarters involves the problem of clearances to enable one part to be placed atop another in axial alignment therewith prior to threading the parts together. Obviously the minimum clearance is the projecting height of the stud plus the thickness of the nut.

Numerous drivers for offset operations have been devised, for example the device shown in U.S. Pat. No. 3,027,789 which issued to Harry L. Bochman, Jr., on April 3, 1962. These devices enable ratchet or power drives to be used in offset situations, but involve the corollary need, because they use a closed socket, that the nut be inserted in the socket before the socket is inserted in the clearance area which is often a clumsy way of doing things, or to require additional clearance on the order of magnitude of the thickness of the wrench, or to at least partially thread the nut onto the stud by hand before applying the wrench, each of which techniques is inefficient and undesirable. With the instant invention, the nut may simply be started on the thread, and then the driver may be applied laterally to the nut without requiring axial shifting of the nut and the socket, enabling an automatic operation to be carried out without requiring anything more than starting the nut on the threads of the stud, and keeping the minimum clearance.

An offset driver according to this invention includes a body, a power shaft having an axis, the power shaft being rotatably mounted to the body. A laterally extending gear train is rotatably mounted to the body and is drivingly engaged to the power shaft. This gear train includes a plurality of power branches, each branch terminating in a driven gear.

The drive socket is rotatably mounted to the body and this socket includes a fastener-engaging cavity with a slot extending through a side wall of the socket. Bearing means mounts the drive socket to the body and a progression of gear teeth extends around the outer periphery of the drive socket except at the slot. The path of these teeth intersects the path of teeth of both of the said driven gears. The angular extent of the slot is less than the angular spacing-apart of the driven gears around the center of rotation of the socket so that at least one of the driven gears is always engaged to the teeth on the socket, there being a slot through the body adjacent to the socket member to pass a fastener to be driven to the cavity when the slots are aligned.

According to a feature of this invention, power bleed means is provided to rotate the socket independently of the operation of the trigger means which controls the motor so that the socket and body slots can be aligned, and detent means is provided to hold them aligned until the trigger means is again actuated.

The above and other features of this invention will be fully understood from the following detailed description and the accompanying drawings, in which:

FIG. 1 is a side elevation principally in axial cross-section of a device according to the invention;

FIG. 2 is a fragmentary view taken at line 2—2 of FIG. 1;

FIG. 3 is a plan view of a portion of FIG. 1;

FIG. 4 is a side elevation principally in axial cutaway cross-section showing another embodiment of the invention;

FIG. 5 is a side elevation partly in cutaway cross-section, showing the presently preferred embodiment of the invention; and FIG. 6 is a cross-section taken at line 6—6 of FIG. 5.

The presently preferred embodiment of the invention is shown in FIG. 1 wherein an offset driver 10 is operating to join a flanged element 11 to a plate 12 by means of threaded studs 13 and nuts 14. The objective of the driver is to thread the nuts onto the studs.

The nut illustrated in FIG. 1 is an inherently torque-limited type having an internally-threaded sleeve 15, and an external driving section 16 joined to the sleeve by a shear web 17 which shears when a predetermined torque is applied to the driving section. This is an inherently torque-limited class of nut, but it will be understood that this driver is adaptable for use with any class of threaded fastener. Also, the device is shown adapted to set a hexagonal nut. It will be further understood that it may be utilized with any form of driving engagement configuration, this configuration forming no part of the invention.

The offset driver includes a body 20 to which is rigidly mounted a tubular extension 21 which supports a motor mount 22. Bearings 23 are supported inside the tubular extension, and these journal a power shaft 24 for rotation relative to the body. A motor 25 for driving the shaft is shown with its case 26 rigidly mounted to the mounts so it will not be rotatable relative to the body, and with its driving jaws 27 engaged to the power shaft so as to turn the same.

A base plate 30 and a cap plate 31 are joined to each other by fasteners 32. A bearing plate 33 is also similarly attached. The bearing plate is best shown in FIG. 2. It extends to the lateral end of the driver and includes an embracive opening with a slot 34 which does not rotate, and is at least as wide as the nut to be received so that the nut can enter a socket yet to be described.

A primary gear 37 is mounted to and driven by the power shaft. It drives a pair of driven gears 38, 39 which form respective power paths with the primary gear. These gears are appropriately mounted for rotation by pins 40. The device is held assembled by fasteners 32.

A socket 45 includes a peripheral progression of teeth 46 which teeth are engageable with the teeth of driven gears 38 and 39. Angular subtense 47 is between gears 38 and 39, on center 36.

The peripheral teeth project beyond surfaces 48, 49 of the socket, these surfaces being at opposite ends of the teeth. They are borne against by base plate 30 and bearing plate 33 and these plates hold the socket in the condition as shown. Bearing plate 33 extends beyond the center of rotation 36 forming a re-entrant curve which holds the socket in this position so that it can not fall out.

The socket itself includes a recess 50 formed with fastener engaging surfaces and with a slot 51 extending all the way through one side thereof. The angular subtense 52 relating to the outer ends of slot 51 will be less than subtense 47.

It will now be seen that because of the relationships of the angular subtenses, in many positions the drive socket will be driven by both power branches. However, when the socket slot passes over one or the other of the driven gears, then only one of the branches will be driving. Because of the relationship between the subtenses, however, there will never be a time or position where no power branch is engaged to the socket.

A modification of the device of FIG. 1 is shown in FIG. 4. In this device a power shaft 55 fits in a device which drives a device which is entirely the same out to the socket. However, instead of a motor drive, it includes a unidirectional clutch drive 56 and a first handle 57 attached to the body and a second handle 58 driving the clutch drive. Therefore, by holding handle 57 and turning handle 58 the device may be driven unidirectionally by hand. In order to aid in the alignment of the slots, a stub 59 is provided on the power shaft which enables the power shaft to be turned by hand so as to align the slots of the sockets and of the cap plate.

FIGS. 5 and 6 show an improvement on the device of FIGS. 1-4. In the latter devices, there is no particular stopping place for the socket slot, and it is often necessary to give short bursts of power to the motor, or manually to turn shaft 59 in order to align the slots in the socket and in the body so that the nut can be inserted into the slot. The embodiment of FIGS. 5 and 6 provides means to keep the socket turning so that the slots can come into alignment, and if desired, detent means can be provided to hold the alignment once it is secured until the motor is again run at full power by pulling the trigger.

This embodiment is generally the same as those of FIGS. 1-4. It has a body 70 with an air motor 71 mounted therein. The motor has an output shaft 72 which is joined by adapter 72a to power shaft 73. Power shaft 73 drives laterally extending gear train 74 which terminates at socket 75.

Socket 75 has a slot 76 and lies between a pair of face plates 77, 78 with a slot 79 as before. The object of the improvements of FIGS. 5 and 6 is to get these slots lined up.

An air hose connection 80 receives air or other motive fluid under pressure from a source thereof. A wobble plate valve 81 is disposed in air supply channel 82. It is shown closed on seat 83. A trigger 84 mounted to the body opens this valve by tilting or lifting the wobble plate 85 against spring 86 so as to lift plate element 87 from the slot. This is shown schematically in the drawings.

Passage 88 conducts pressure fluid from valve 81 to the motor to run the same under power. A by-pass passage 89 is drilled through the wobble plate so as to provide a reduced supply of fluid to the motor at all times which will just keep the motor turning over slowly, but at a rate which will permit the motor readily to be stalled out. It is of lesser diameter than passage 88.

A plunger guide 90 guides the trigger for axial movement. The trigger is spring loaded to the right in FIG. 5.

A detent system 95 is provided to hold the gear system against rotation which the slots in the socket and in the body are aligned. It is interposed between the power system and the body. It is shown detaining the power shaft although it is obvious that it can be located elsewhere instead so long as it impedes the drive function. The detent system includes a recess 96 in the outer wall of the power shaft, and a trigger extension 97 with a tang 98 that is spring-loaded against the power shaft. The extension is springy so as to exert the necessary bias force.

The recess includes a cam section 99 which slopes from the bottom of the recess to the outer wall of the power shaft. A flat section 100 is located axially forward so as to prevent rotation. When the trigger is released and the slow rotation brings recess 96 to the tang, the tang snaps into the recess and abuts section 100. The trigger is released and biased forwardly at the time, because the tool is not driving, only turning over very slowly. The device is then stopped in the indexed position. When driving is to be done, the trigger is pulled, which draws the tang to the left in FIG. 5 onto cam section 99, so the motor can turn. The tang is then cammed up to the outer wall of the power shaft, and when the trigger is released, it will move forward so it can again drop against section 100 and stop the tool in the indexed position.

This device thereby provides a driver which may be inserted laterally onto a nut thereafter to be driven in an offset manner in a height-limited environment either with power or by hand and with further features to enable the device readily to be preadjusted to a slot-aligned condition.

This invention is not to be limited by the embodiments shown in the drawings and described in the description which are given by way of example and not of limitation, but only in accordance with the scope of the appended claims.

What I claim is:

1. An offset driver for driving threaded fasteners in height-limited environments comprising: a body, a power shaft having an axis, the power shaft being rotatably mounted to the body, a laterally-extending gear train rotatably mounted to the body and drivingly engaged to the power shaft, the gear train including a plurality of power branches, each branch terminating in a driven gear; a drive socket rotatably mounted to the body which socket includes a fastener-engaging cavity with a slot extending through a side wall of the socket; bearing means mounting the drive socket to the body; a progression of gear teeth on the outer periphery of said drive socket, the path of which teeth intersects the path of the teeth of both of said driven gears, the progression being interrupted by the slot, the angular extent of the slot being less than the angular spacing of said driven gears around the center of rotation of said socket, whereby at least one of said driven gears is always engaged to the teeth on said socket, there being a slot through the body adjacent to the socket member to pass a fastener to be driven to the cavity when the slots are aligned; fluid driven motor means mounted to the body and drivingly connected to the power shaft; a valve in said body interposed between the motor and a source of fluid for driving the motor; trigger means to open said valve; and by-pass means forming a by-pass conduit around said valve to permit slow rotation of the motor whereby the slots may be aligned with the valve closed.

2. An offset driver according to claim 1 in which detent means is interposed between the power shaft or the gear train and the body to restrain the rotation of the system unless the trigger is moved.

3. An offset driver according to claim 2 in which the detent means comprises a recess in the power shaft and an extension of the trigger which is biased toward the power shaft.

References Cited

UNITED STATES PATENTS

| | | | |
|---|---|---|---|
| 3,477,318 | 11/1969 | Batten | 81—57.3 |
| 2,787,180 | 4/1957 | Fish | 81—58.2 X |
| 2,482,387 | 9/1949 | Veneman | 81—57.3 X |

JAMES L. JONES, Jr., Primary Examiner

U.S. Cl. X.R.

81—58.2